(12) United States Patent
Fujiwara et al.

(10) Patent No.: US 8,135,027 B2
(45) Date of Patent: Mar. 13, 2012

(54) COMMUNICATION APPARATUS ENABLING TEMPORAL COEXISTENCE OF SYSTEMS

(75) Inventors: Yuki Fujiwara, Osaka (JP); Go Kuroda, Osaka (JP); Koji Ikeda, Fukuoka (JP); Akio Kurobe, Osaka (JP)

(73) Assignee: Panasonic Corporation, Osaka (JP)

( * ) Notice: Subject to any disclaimer, the term of this patent is extended or adjusted under 35 U.S.C. 154(b) by 754 days.

(21) Appl. No.: 11/730,489

(22) Filed: Apr. 2, 2007

(65) Prior Publication Data

US 2007/0230498 A1 Oct. 4, 2007

(30) Foreign Application Priority Data

Apr. 3, 2006 (JP) .................................. 2006-102272

(51) Int. Cl.
*H04B 7/212* (2006.01)
(52) U.S. Cl. .................. 370/442; 340/12.32; 340/13.23
(58) Field of Classification Search .................. 370/442, 370/465; 340/310.11, 310.14, 310.16, 12.32, 340/13.23
See application file for complete search history.

(56) References Cited

U.S. PATENT DOCUMENTS

| | | | | |
|---|---|---|---|---|
| 4,377,804 | A * | 3/1983 | Suzuki ........................ | 375/356 |
| 2004/0037311 | A1* | 2/2004 | Willes et al. .................. | 370/465 |
| 2005/0032534 | A1* | 2/2005 | Yoshizawa et al. ........... | 455/507 |
| 2006/0003777 | A1* | 1/2006 | Nonoyama et al. ........... | 455/457 |
| 2006/0165047 | A1* | 7/2006 | Kodama et al. ............... | 370/350 |
| 2007/0025384 | A1* | 2/2007 | Ayyagari et al. .............. | 370/445 |
| 2007/0206345 | A1* | 9/2007 | Kodama et al. ............... | 361/601 |
| 2010/0104030 | A1* | 4/2010 | Koga et al. .................... | 375/257 |

FOREIGN PATENT DOCUMENTS

| | | |
|---|---|---|
| FR | 2 469 055 | 5/1981 |
| JP | 8-251096 | 9/1996 |
| JP | 2000-151547 | 5/2000 |
| JP | 2002-368831 | 12/2002 |

(Continued)

OTHER PUBLICATIONS

HomePlug® AV White Paper, Copyright © 2005, Document version No. HPAVWP-050818.*

(Continued)

*Primary Examiner* — Derrick Ferris
*Assistant Examiner* — Matthew Hopkins
(74) *Attorney, Agent, or Firm* — Wenderoth, Lind & Ponack, L.L.P.

(57) ABSTRACT

A communication apparatus, which is capable of allowing a plurality of communication systems respectively having different types of communication modes to coexist with one another on a single communication medium, satisfying Qos requirements with the use of only a simple configuration thereof, and minutely setting an exclusive use rate of a medium, is provided. A coexistence signal cycle T 209 is divided into M time periods by a communication slot unit 207 which is constituted of N communication slots. At least one communication slot in the communication slot unit 207 is defined as a "D-Slot" which can obtain a communication right M/X times during the coexistence signal cycle T 209, and remaining communication slots other than the D-Slot in the communication slot unit 207 is defined as "S-Slots" which can obtain the communication right M times during the coexistence signal cycle T 209. A communication band to be used exclusively in one communication system is allocated in a unit of 1/X of the communication slot D-Slot, and also in a unit of one of the communication slots S-Slots.

14 Claims, 13 Drawing Sheets

FOREIGN PATENT DOCUMENTS

| | | |
|---|---|---|
| JP | 2004-40646 | 2/2004 |
| JP | 2005-73240 | 3/2005 |
| JP | 2007-19618 | 1/2007 |
| WO | 2004/015907 | 2/2004 |

OTHER PUBLICATIONS

Ohmi et al., "A Media Access Control Method for High-Speed Power Line Communication System Modems", IEEE CCNC 2004.*

HomePlug® Power Alliance, Inc., Copyright © 2005, HomePlug® AV White Paper, Document version No. HPAVWP-050818, referenced within this office action as HomePlug® Power Alliance, Inc.*

Lin et al., "A Comparative Performance Study of Wireless and Power Line Networks", *IEEE Communication Magazine*, pp. 54-63, Apr. 2003.

Supplementary European Search Report issued Mar. 11, 2010 in corresponding European Application No. 07 74 0097.

"HomePlug AV White Paper", Internet Citation, Dec. 31, 2005, XP003018236, Retrieved from the Internet: URL:htpp://www.homeplug.org/products/white papers/HPAV-White-Paper_050818.pd> [retrieved on Jan. 1, 2007].

* cited by examiner

FIG. 3

| NUMBER OF D-SLOT / NUMBER OF S-SLOT | 0 | 1 | 2 | 3 |
|---|---|---|---|---|
| 0 | 0% | 6.7% | 13.3% | 20% (17.8%) |
| 1 | 20% | 26.7% | 33.3% | 40% (37.8%) |
| 2 | 40% | 46.7% | 53.3% | 60% (57.8%) |
| 3 | 60% | 66.7% | 73.3% | 80% (77.8%) |
| 4 | 80% | 86.7% | 93.3% | 100% (97.8%) |

COMMUNICATION APPARATUS ENABLING TEMPORAL COEXISTENCE OF SYSTEMS

BACKGROUND OF THE INVENTION

1. Field of the Invention

The present invention relates to a mechanism to allow a plurality of different communication systems respectively having different communication modes to coexist with one another on a single communication medium. More particularly, the present invention relates to a technique of allowing Power Line Communication (PLC) modems, one of which ensures QoS (Quality of Service) required by communication service and another of which performs best-effort communication, to coexist with each other, and also relates to a communication apparatus included in each of the plurality of the communication systems.

2. Description of the Background Art

There has been a PLC technique as one of communication means for connecting a home personal computer (PC) to network equipment such as a broadband router so as to access the Internet from the home PC. The PLC technique utilizes an existing power line as a communication medium, and thus can realize high-speed communication only by inserting AC mains plug into any one of AC mains outlets in a household without additional wiring. Therefore, research and development or an experimental demonstration relating to the PLC technique is being performed vigorously worldwide. In Europe and the United States, there are a number of cases where the PLC technique has already been commercialized.

An exemplary PLC technique is the HomePlug Ver.1.0 specified by HomePlug Powerline Alliance in the U.S. For example, see p54-p63 of "A Comparative Performance Study of Wireless and Power Line Networks", written by Yu-Ju Lin et. al., published by, IEEE Communication Magazine, in April 2003. This specification considers the Internet, an e-mail, and file transfer by using a PC as main use applications thereof. In the specification, a CSMA/CA method is adopted as a media access control so as to control PLC modems accessing a power line. Therefore, the specification can realize only best-effort communication which cannot ensure a fixed band width to be used.

FIG. 7 is a diagram illustrating a general configuration of the Internet access from the home PC.

A PC 701 used by a user is connected to an Internet access router 704 via the Ethernet (registered trademark) 702, and then connected to the Internet 705 via an access line 703. Generally, an ADSL (Asymmetric Digital Subscriber Line) or an FTTH (Fiber To The Home) is used as an exemplary access line 703. In most cases, in the household, a place where the access line 703 is drawn is different from a room in which the PC 701 is situated. In such case, there is a problem in that the Ethernet (registered trademark) 702 cable has to be routed from the Internet access router 704 to the PC 701.

In the field of the PLC, the conversion adapter between the powerline and the Ethernet (registered trademark) (hereinafter referred to as a P/E conversion adapter) has been commercialized so as to reduce the routing. FIG. 8 shows a general configuration relating to the Internet access in the case where the P/E conversion adapter is used.

In FIG. 8, two P/E conversion adapters 805 are respectively connected to the AC mains outlets in one room where a PC 801 is situated and in another room where an Internet access router 804 is situated. The best-effort communication is realized by using the PLC via a power line 807 and a distribution switch board 808 in the household. In this manner, with the use of the PLC, it is possible to realize the high-speed communication only by inserting the AC mains plug into the AC mains outlets situated anywhere in the household without the additional wiring.

On the other hand, there is a move to build a new network appliance system which applies the PC-led Internet technology to AV equipment and communication equipment. The move is developing into a new system such as a linkage between an AV server (a DVD recorder, a HDD recorder and the like) and a TV, which are respectively situated indifferent rooms, or a combination between an IP phone or an IP camera, which applies the Internet technology, and the TV or the PC.

FIG. 9 is a diagram showing an exemplary new system as above described. Unlike the conventional Internet, e-mail and file transfer, real time communication needs to be ensured for an AV stream and voice communication. Particularly, in the case of a telephone where mutual voice communication is taken place in real time, there is a strong request for "no" communication delay, and thus the communication delay is restricted to as little as about 10 msecs., in general. For such service that needs to ensure QoS (Quality of Service), there has been a problem in that the best-effort communication cannot satisfy the requested quality.

To ensure the QoS, a PLC method is being developed. For example, see "A Media Access Control Method for High-Speed Power Line Communication System Modems", written by Shinichiro Ohmi, IEEE CCNC 2004. FIG. 10 is a diagram illustrating a PLC which performs a best-effort communication (hereinafter referred to as a best-effort type PLC) and a PLC which needs to ensure QoS (hereinafter referred to as a QoS type PLC). In FIG. 10, the vertical axis indicates a frequency, and the horizontal axis indicates time.

In the case of HomePlug ver.1.0, which is an exemplary best-effort type PLC, the frequency to be used approximately ranges from 2 MHz to 21 MHz. The time axis varies depending on a data generation timing or a data amount. In the case of displaying an Internet website or obtaining an e-mail, a service thereof may be acceptable even if the display or obtainment is delayed, as long as the delay is within an acceptable time range.

On the other hand, the QoS type PLC is, in most cases, aimed at a high-speed transmission of a video data, and uses a broader frequency range. Further, in order to ensure the QoS, one QoS controller is situated in a system. The QoS controller controls timing and an amount of data transmitted from the power line modem by transmitting a beacon at fixed intervals ((b) of FIG. 10). A function of the QoS controller may be included in one power line modem, and in an example shown in FIG. 9, the Qos controller is mounted in a P/E conversion adapter 909.

Assuming that an amount of video data as well as a communication speed are respectively fixed, data is transmitted to the power line for a fixed time period at fixed time intervals ((b) of FIG. 10). If the data does not arrive at a receiving side by a predetermined time, video distortion will be induced, and consequently the service cannot be provided. Further, since equipment connected to the power line and an operation state thereof varies overtime, a communication condition thereof is not constant, but substantially varies from hour to hour. When the communication speed slows down, time required for transmitting the data varies. Therefore, when a power line modem which transmits video data detects a slow down in the transmission speed, the power line modem informs the QoS controller of the slow down by using a communication command, and also receives a time allocation required for transmitting the same amount of data as before the slow down, thereby ensuring the QoS. This situation is shown in FIG. 11. In FIG. 11, the power line modem, which has detected the slow down in the transmission speed, transmits a change allocated time command to the QoS controller so as to change and extend the data transmission time thereafter. Accordingly, it is possible to keep transmitting a fixed amount of data per unit time.

In this manner, various types of PLC techniques have been developed. The power lines wired into respective households are each connected to the distribution switch board. In the case where different types of power line modems are used in one household, from a standpoint of one type of a power line modem, a signal transmitted to the power line from another type of a power line modem is merely seen as a noise. Therefore, in this case, when communications are performed simultaneously, as shown in (c) of FIG. 10, the communications are interrupted mutually, or the respective communications become incapable, whereby the communication speed slows down significantly.

To solve this problem, Japanese Laid-Open Patent Publication No. 2002-368831, for example, suggests a method of controlling data transmission of power line modems, in the case where there is, on a single power line, a plurality of the power line modems respectively having different data communication modes. FIG. 12 is a diagram illustrating this conventional technique.

In FIG. 12, a selection section 61 in an administrative processor 6 selects, for example, mode B power line modems 4a to 4m as transmission permitted power line modems. A message generation section 62 generates a transmission permission message which instructs the mode B power line modems 4a to 4m of transmission permission, and also generates a transmission prohibition message which instructs mode A power line modems 3a to 3m of transmission prohibition. A mode A power line modem 3n transmits the transmission prohibition message to the mode A power line modems 3a to 3m. A mode B power line modem 4n transmits the transmission permission message to the mode B powerline modems 4a to 4m.

In the above-described technique, however, all possible communication modes need to be mounted on a coexistence control terminal, and thus in the case where there exist three or more communication modes, it causes a problem since equipment costs increases. Further, in the case of emergence of a novel communication mode in the future, a coexistence control terminal accommodating the novel communication mode needs to be developed, which consequently leads to a problem in that it is very difficult to maintain a state of the coexistence.

As an exemplary technique to solve the problem, coexistence control signal transmitting section, which is simple and easily mountable, is provided to all the PLC systems, and a communication band is processed through TDM (Time Division Multiplexing) by using the coexistence control signal so as to enhance the coexistence of a plurality of different communication modes.

For example, as shown in FIG. 13, the communication band is defined such that a time period, during which a coexistence control signal 1301 is sent and received at a predetermined timing, is repeated in a cycle 1309, and a time period 1308 are divided by a time period 1307 which is constituted of a unit of N segments (communication slots). By using the coexistence control signal 1301 sent and received in the cycle 1309, the right of use of the N communication slots is allocated to any one of the PLC systems individually, whereby coexistence among the communication systems can be realized.

To enhance economical medium sharing among communication systems, it is desirable to set an exclusive medium use rate minutely. However, in the conventional communication system shown in FIG. 13, the communication slots, which are fixed with respect to the respective time periods 1307, are allocated to respective communication systems, and thus the exclusive medium use rate of each of the communication systems can be set only in a unit of 1/N.

In order to minutely set the exclusive medium use rate, a method of increasing the number of the communication slots dividing the time period 1307 (that is, incrementing a variable N) maybe considered. However, each of the communication slots needs a header part of a transmission frame, and thus the more the number of the communication slots increases, the more transmission efficiency deteriorates since overhead of the header part increases. For example, in the case where communication is performed by using a popular PLC system of 10 Mbps or more, it is preferable to set one communication slot length to 3 msecs. or longer.

On the other hand, in order to minutely set the exclusive medium use rate, another method for extending the time period 1307 (in this case as well, the variable N is incremented), while keeping the one communication slot length as it is, may be considered. However, since the TDM cycle are extended, it is difficult for this method to be applied to a service which requires "low" latency such as a VoIP (Voice over IP). Specifically, the TDM cycle needs to be 20 to 30 msecs., and it is only possible to set about N=10 even for the case of the minimum communication slot length.

Therefore, it is difficult to satisfy the QoS requirement and minutely set the exclusive medium use rate by using only the conventional simple configuration, as above described.

SUMMARY OF THE INVENTION

Therefore, an object of the present invention is to provide a communication apparatus which allows a plurality of communication systems having different communication modes to coexist on a single communication medium, satisfies a Qos requirement by using only a simple configuration, and is capable of setting an exclusive medium use rate minutely.

The present invention is directed to a communication apparatus used for a plurality of communication systems respectively coexisting with one another on a single communication medium through time-division communication and also to a communication apparatus coexisting with other communication apparatuses. To achieve the above-described object, the communication apparatus of the present invention comprises a coexistence control section for allocating a communication slot to be used exclusively by a communication system belonging to the communication apparatus or the communication apparatus in a unit of 1/X of a first 1 communication slot and in a unit of one of second communication slots, and a coexistence signal transmitting section for transmitting a coexistence signal representing the communication slot to be used exclusively, which is allocated by the coexistence control section, to the other communication systems or the other communication apparatuses.

In the present invention, the cycle T is divided into M time period (M is an integer of 2 or more) by a communication slot unit including N communication slots (N is an integer of 2 or more). At least one communication slot in the communication slot unit is defined as a first communication slot which can obtain a communication right M/X times(X is a submultiple of M) during the cycle T, and remaining communication slots other than the first communication slot in the communication slot unit are defined as communication slots which can obtain the communication right M times during the cycle T.

Preferably, the coexistence signal includes X segments each corresponding to 1/X unit of the first communication slot and N segments each corresponding to one unit of the second communication slots, and an exclusive use of the communication slot which is allocated by the coexistence control section is declared by storing predetermined information on a segment, among a plurality of segments representing the X segments and the N segments of the coexistence signal, corresponding to the communication slot to be used exclusively.

Typically, the first communication slot is set as 1 piece, and the second communication slots are set as N-1 pieces.

Further, in the case where the communication medium is a power line, it is preferable that a starting point of the cycle T is set at a zero cross point of an AC current flowing on the power line.

According to the above-described present invention, it is possible to allow a plurality of communication systems respectively having different types of communication modes to coexist with one another on a single communication medium, satisfy QoS requirements with the use of a simple configuration, and to set an exclusive medium use rate minutely.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing an exclusive medium use rate with respect to the number of communication slots secured by the communication system in the case based on the definition shown in FIG. 2;

DESCRIPTION OF THE PREFERRED EMBODIMENTS

Hereinafter, an embodiment of the present invention will be described by using an exemplary case of a PLC system which applies a power line as a communication medium. The communication medium may be wireless, or may be wired with any material other than the power line.

Figure 1:
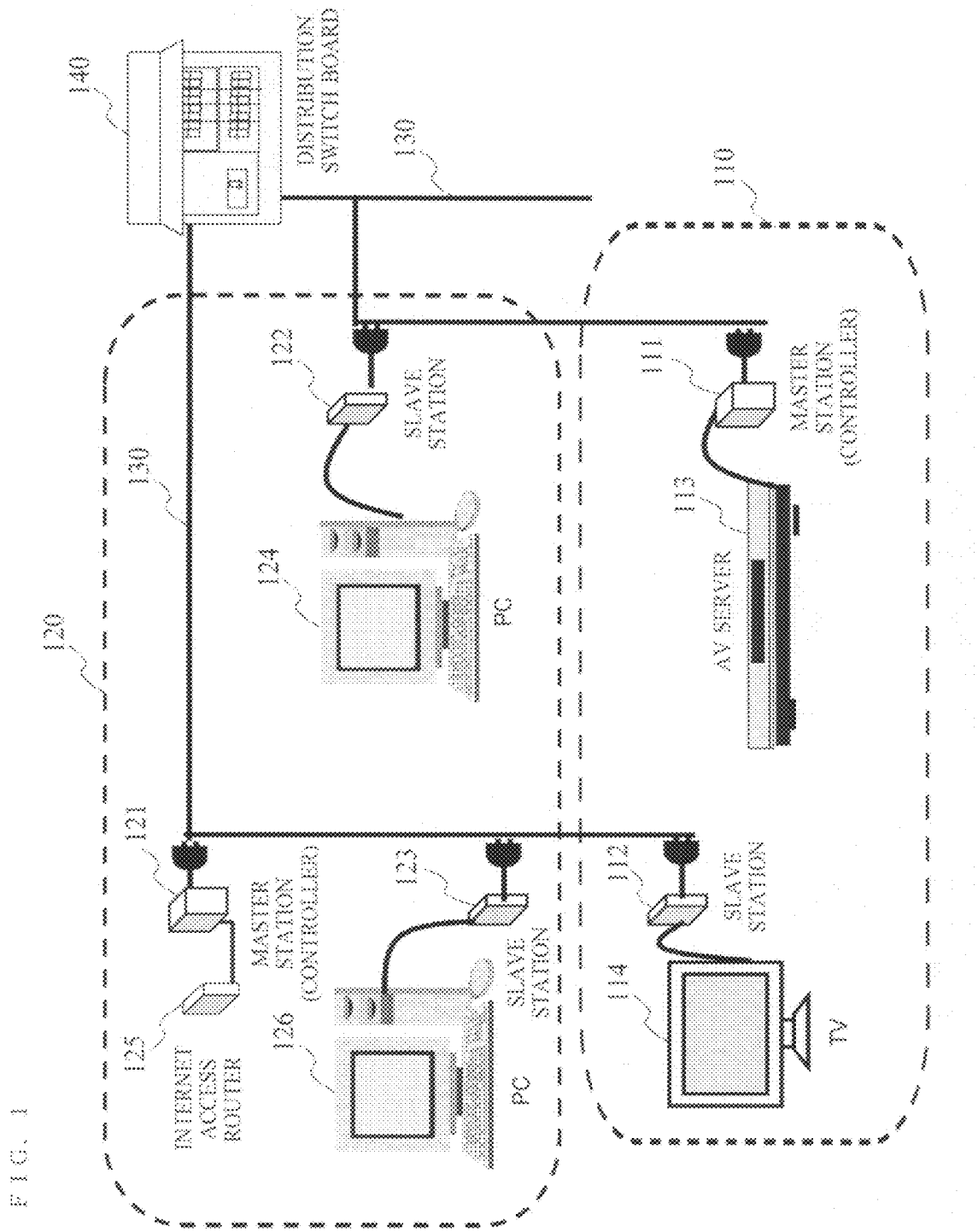
FIG. 1 is a diagram showing an example of a PLC system constituted of a communication apparatus according to one embodiment of the present invention.

FIG. 1 is a diagram showing an example of a PLC system constituted of a communication apparatus according to one embodiment of the present invention. In FIG. 1, a communication system 110 and a communication system 120 are defined. The communication system 110 is a communication system which uses a power line 130 wired in a household and which is constituted of a communication apparatus 111 (hereinafter referred to as a master station) for controlling coexistence with the other communication system 120, and another communication apparatus 112 (hereinafter referred to as a slave station). The slave station 112 operates under the control of the master station 111 so as to control the coexistence with the communication system 120, and at least one slave station 112 exists in one communication system 110. The communication system 120 has a data communication mode which is different from the communication system 110 and also uses the power line 130 wired in the household. The data communication system 120 is, as with the communication system 110, constituted of one master station 121 and other slave stations 122 and 123. The respective master stations and slave stations are connected to various electronic apparatuses.

Hereinafter a method will be described, which causes, in the PLC system shown in FIG. 1, the communication system 110 and the communication system 120, whose data communication modes are different from each other, to coexist with each other without interrupting respective communications, and which minutely sets band allocation (exclusive medium use rate) by using TDM. In the embodiment hereinbelow, a communication system which allocates a communication band by using only the TDM will be described. However, the communication system is also applicable to a TDM processing portion of a communication system which allocates a communication band two-dimensionally by using TDM and FDM (Frequency Division Multiplexing).

Figure 2:
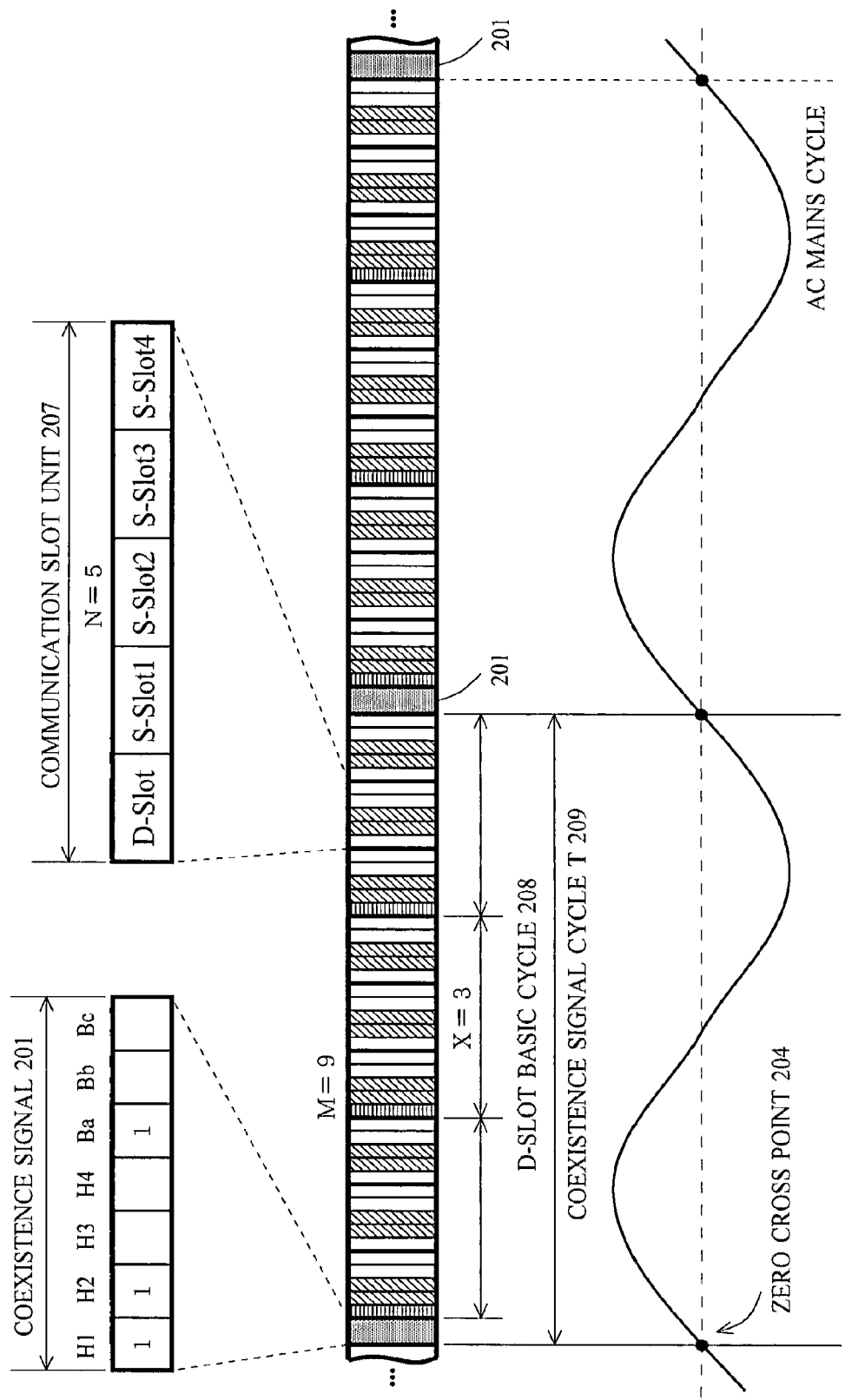
FIG. 2 is a diagram showing an exemplary coexistence signal 201 and a communication slot defined in the communication apparatus according to the one embodiment of the present invention.

FIG. 2 is a diagram showing an exemplary coexistence signal 201 transmitted from the master stations 111 and 121 in the communication systems 110 and 120, respectively. It is very important to inexpensively realize a structure required to control the coexistence signal 210. On the other hand, the structure also has to satisfy high communication accuracy on the power line which has severe communication conditions.

In the present invention, an exemplary method will be described, which accurately synchronizes the coexistence signal sent and received between the respective communication systems, by using a zero cross point of an AC mains cycle as a reference. Instead of using the zero cross point of the AC mains cycle as the reference, a time point when a phase of an AC voltage is shifted from the zero cross point by a predetermined amount, for example, may be used as the reference. Further, the coexistence signal need not be sent and received continuously at a timing of either of the above-described references, but may be sent and received intermittently at given intervals.

The present embodiment defines, as follows, the coexistence signal 201 periodically sent by setting a zero cross point 204 of an AC current flowing through the power line 130, i.e., a point where a phase becomes 0 degrees, as a reference, and a plurality of communication slots set by time-dividing an interval between any two successive coexistence signals 201, i.e., a coexistence signal cycle T 209.

First, the coexistence signal cycle T 209 is divided into M time periods (M is an integer of 2 or greater) by a communication slot unit 207 constituted of N communication slots (N is an integer of 2 or greater). In the communication slot unit 207, one communication slot is defined as "D-Slot" which can obtain a communication right M/X times (X is a submultiple of M) during the coexistence signal cycle T 209, and the remaining N-1 communication slots are defined as "S-Slots" which can obtain the communication right M times during the coexistence signal cycle T 209. The invariable N is preferably set to 10 or smaller as above described. The invariable M is determined depending on how minutely the exclusive medium use rate can be set.

FIG. 2 illustrates an example where the communication slot unit 207 includes 5 (=N) communication slots constituting of D-Slot and S-Slots 1 to 4, and a time period during which the communication slot unit 207 is repeated 9 times (=M) is defined as the coexistence signal cycle T 209.

The coexistence signal 201 defines a segment for storing information of the communication slots used by the communication system. The segment is defined in accordance with the number of the communication slots S-Slots included in the communication slot unit 207 as well as a basic cycle (a D-Slot basic cycle 208) to which the communication slot D-Slot is allocated.

FIG. 2 illustrates an example where, the coexistence signal 201 is defined as seven segments which are constituted of four segments H1 to H4 corresponding to the number of the communication slots S-Slots included in the communication slot unit 207, and three segments Ba, Bb and Bc corresponding to the D-Slot basic cycle 208. That is, one D-Slot basic cycle 208 is constituted of three (=X) communication slot units 207.

Each of the communication systems 110 and 120 declares a communication slot to be used exclusively as follows, by using the coexistence signal 201 defined as above described and a plurality of communication slots. As an exemplary regulation information indicating use/non-use of the communication slot, a case where a bit "1"/bit "0" is applied will be described in detail by using an example shown in FIG. 2.

A communication system, which prefers to use the communication slot S-Slot 1 exclusively, generates the coexistence signal 201 having the bit "1" stored in the segment H1, and then transmits the coexistence signal 201 to another communication system at a timing of the zero cross point 204. Accordingly, the use of the communication slot S-Slot 1 is declared. In a similar manner, use of the communication slots S-Slots 2 to 4 is also declared by generating and transmitting the coexistence signals 201 having the bit "1" stored in the segments H2 to H4, respectively. Accordingly, it is possible to allocate a communication band to a plurality of the communication systems, without causing a conflict with each other, in a unit of one communication slot S-Slot, that is, in the example of FIG. 2, in a unit of ⅕ of the communication slot (20% of a whole communication band).

Further, a communication system, which prefers to exclusively use the communication slot D-Slot, generates the coexistence signal 201 having the bit "1" stored in some or all of the segments Ba, Bb and Bc and transmits the coexistence signal 201 to another communication system at the timing of the zero cross point 204. The coexistence signal 201 having the bit "1" stored in the segment Ba is used to declare that a first communication slot D-Slot of every D-Slot basic cycle 208 is used exclusively. The coexistence signal 201 having the bit "1" stored in the segment Bb is used to declare that a second communication slot D-Slot of the every D-Slot basic cycle 208 is used exclusively. The coexistence signal 201 having the bit "1" stored in the segment Bc is used to declare that a third communication slot D-Slot of the every D-Slot basic cycle 208 is used exclusively.

The bit "1" is set to any one of the segments Ba, Bb and Bc, and then ⅓ of the communication slot D-Slot is allocated, whereby it is possible to allocate the communication band in a unit of further ⅓ of ⅕, that is, 1/15 of the communication slot unit (6.67% of the whole communication band). In a similar manner, the bit "1" is set to any two of the segments Ba, Bb and Bc, and ⅔ of the communication slot D-Slot is allocated thereto, whereby it is possible to allocate the communication band in units of further ⅔ of ⅕, that is 2/15 of the communication slot unit (13.3% of the whole communication band). If the bit "1" is set to all of the segments Ba, Bb and Bc, the communication slot D-Slot is used exclusively in a whole time period thereof, which represents that the communication slot D-Slot is simply used as one communication slot S-Slot.

FIG. 3 shows an exclusive medium use rate with respect to the number of the communication slots secured by the communication system in accordance with the definition shown in FIG. 2.

As is clear from FIG. 3, the use of the communication slot D-Slot is defined by time-division without changing the communication slot unit 207, whereby the exclusive use rate can be changed minutely without deteriorating the communication efficiency. For example, in the case where an amount of data to be transmitted is small and not enough to exclusively use the communication slot S-Slot, it is possible to perform communication by using the communication slot D-Slot only, thereby flexibly allocating a communication slot to a best-effort type communication system. The coexistence signal 201 is sent and received in every coexistence signal cycle T 209, and thus it is possible for each of the communication systems to dynamically change a communication slot exclusively used thereby in every coexistence signal cycle T 209. Further, it is possible to represent allocation of the communication slot D-Slot by using simple information such as 1 bit or the like, whereby a waste of communication resources by the coexistence signal 201 can be reduced.

Figure 4:
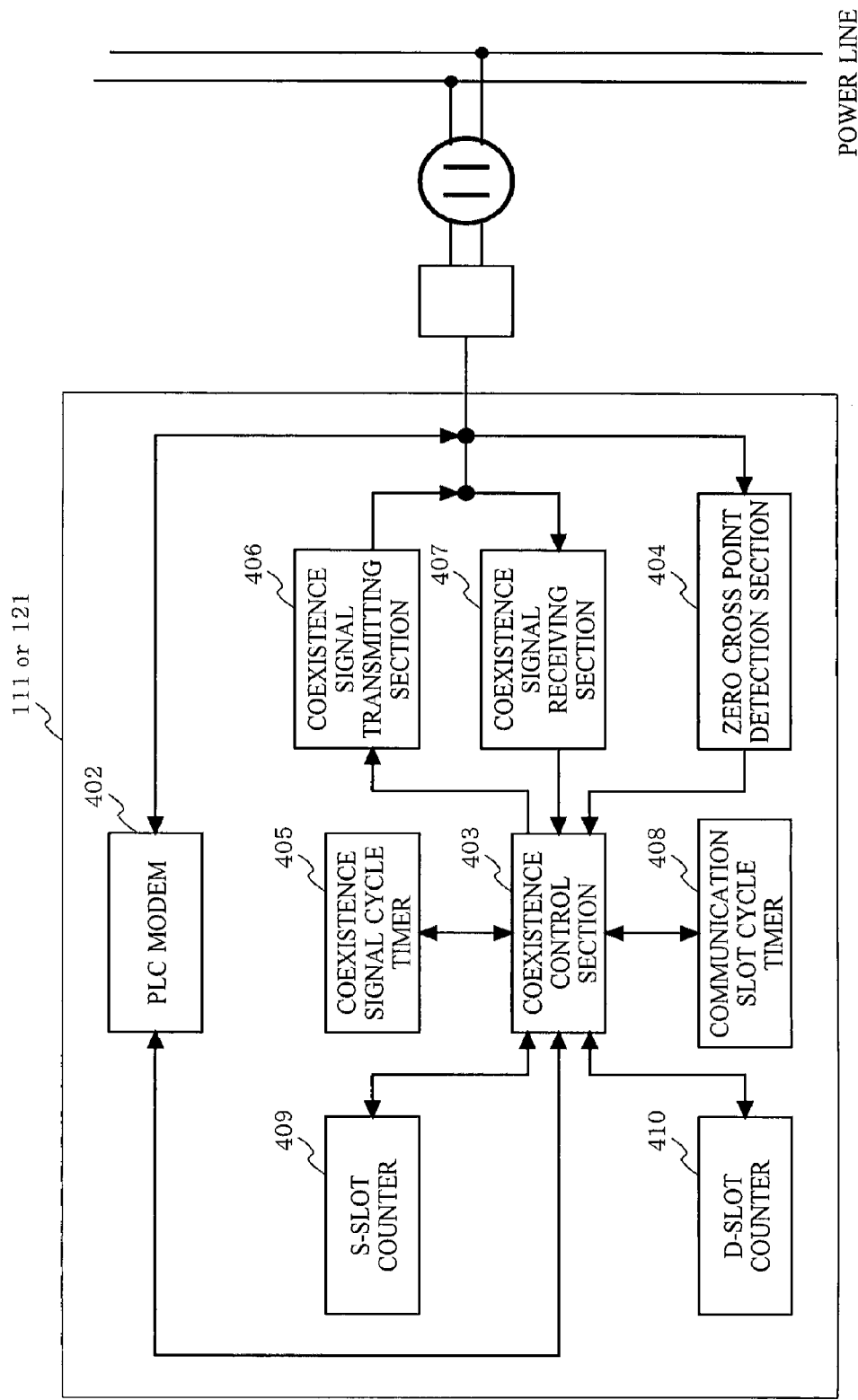
FIG. 4 is a diagram illustrating, in detail, an exemplary configuration of master station 111 or 121.

Next, a configuration of the master station 111 or 121 will be described. FIG. 4 is a diagram illustrating, in detail, an exemplary configuration of the master station 111 or 121.

The master station 111 or 121 includes a PLC modem 402, a coexistence control section 403, a zero cross point detection section 404, a coexistence signal cycle timer 405, a coexistence signal transmitting section 406, a coexistence signal receiving section 407, a communication slot cycle timer 408, a S-Slot counter 409, and a D-Slot counter 410.

The PLC modem 402 performs a series of controls relating to data communication. The coexistence control section 403 performs a series of controls relating to coexistence of PLC modems having difference modes. The zero cross point detection section 404 detects a zero cross point of an AC current flowing through the power line. The coexistence signal cycle timer 405 starts operating at the time of startup, and measures the coexistence signal cycle T 209. The coexistence signal transmitting section 406 generates the coexistence signal 201 in accordance with coexistence signal information given by the coexistence control section 403, and transmits the coexistence signal 201 on the power line. The coexistence signal receiving section 407 detects, in accordance with a reception start instruction given by the coexistence control section 403, the coexistence signal 201 flowing through the power line, and notifies the coexistence control section 403 of the use/non-use information of each of the communication slots by analyzing the detected coexistence signal. The communication slot cycle timer 408 starts operating at the time of start up, and measures the time of one of the communication slots. The S-Slot counter 409 counts the number of the communication slots S-Slots. The D-Slot counter 410 counts an order of the communication slots D-Slots in the D-Slot basic cycle 208.

Figure 5:
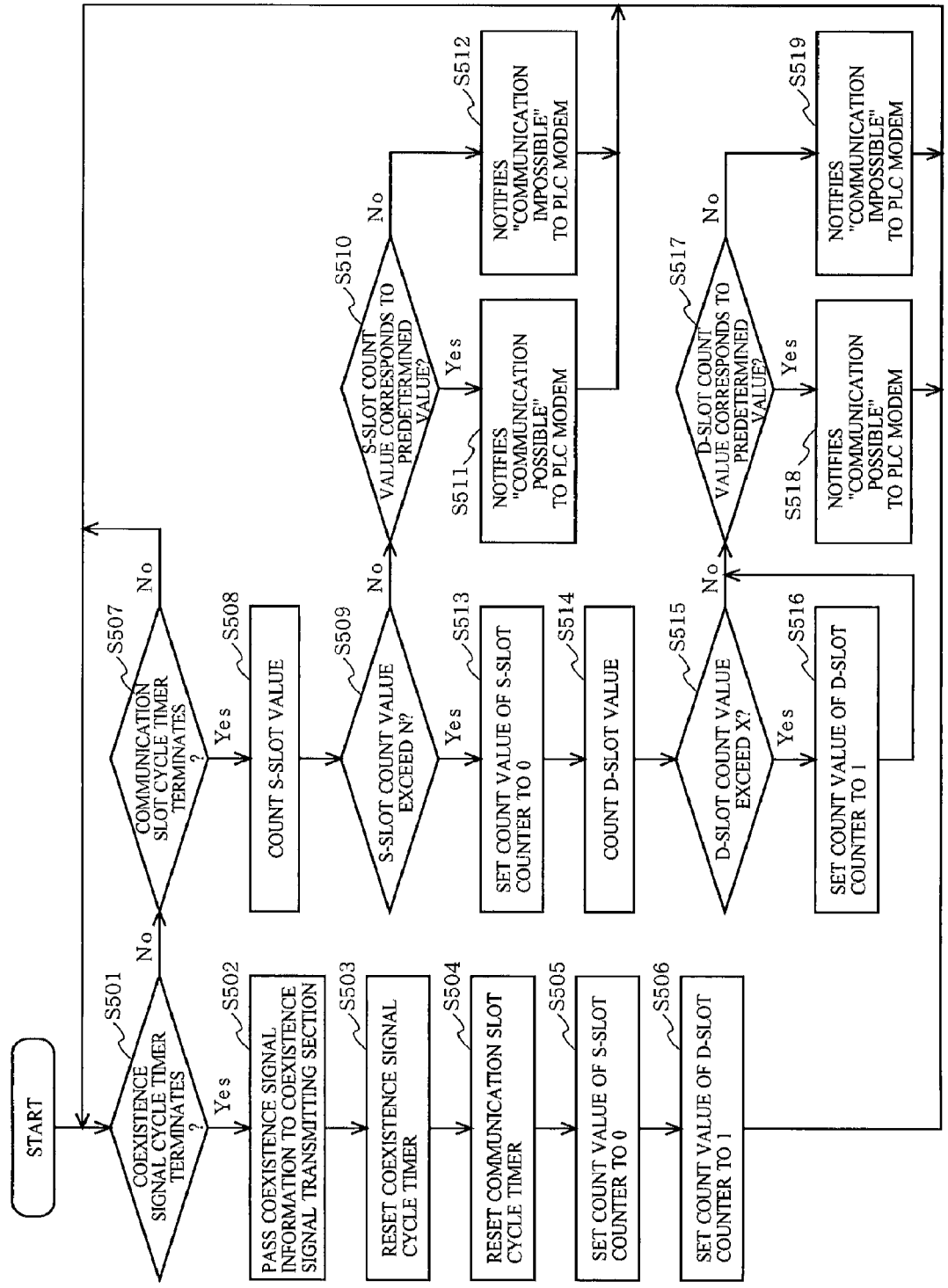
FIG. 5 is a flowchart illustrating an operation of the master station 111 or 121 in a stationary state.

Next, an operation of the master station 111 or 121 will be described. FIG. 5 is a flowchart illustrating the operation of the master station 111 or 121 in a stationary state.

Immediately after startup, the coexistence control section 403 determines a communication slot to be used by a communication system which includes the coexistence control section 403 in accordance with communication slot request information given by the PLC modem 402 and information of the coexistence signal 201 which is sent by another communication system and received by the coexistence signal receiving section 407. The coexistence control section 403 passes, to the coexistence signal transmitting section 406, the coexistence signal information so as to declare exclusive use of the determined communication slot at a timing of the zero cross point of the AC current notified by the zero cross point detection section 404, and then instructs the coexistence control section 403 to generate the coexistence signal 201 and to transmit the same to the power line. Accordingly, the communication system becomes a stationary state under which the communication system can secure the communication slot and start data communication.

The coexistence control section 403 of the communication system, which has become the stationary state, determines a time point when the coexistence signal cycle timer 405 terminates (step S501). At the time point when the coexistence signal cycle timer 405 terminates, the coexistence control section 403 passes the coexistence signal information to the coexistence signal transmitting section 406 so as to transmit the coexistence signal 201 (step S502). Further, the coexistence control section 403 resets the coexistence signal cycle timer 405 and the communication slot cycle timer 408 (step S503, S504). Further, the coexistence control section 403 resets the S-Slot counter 409 and the D-Slot counter 410, and sets a count value of the D-Slot counter 410 to "1".

On the other hand, until the coexistence signal cycle timer 405 terminates, the coexistence control section 403 determines a time point when the communication slot cycle timer 408 terminates (step S507). At the time point when the communication slot cycle timer 408 terminates, the coexistence control section 403 counts up the S-Slot counter 409 (step S508). Next, the coexistence control section 403 determines whether or not a count value of the S-Slot counter 409 exceeds N, which represents the number of the communication slots contained in the communication slot unit 207 (step S509). Under the circumstance where the count value of the S-slot counter does not exceed N representing the number of the communication slots, the coexistence control section 403 notifies the PLC modem 402 of "communication possible" if the count value of the S-Slot counter 409 is equivalent to a predetermined value corresponding to the secured communication slot, whereas the coexistence control section 403 notifies the PLC modem 402 of "communication impossible" if the count value is not equivalent to the predetermined value and returns to step S501 (steps S510 to S512).

On the other hand, in the case where the count value of the S-slot counter 409 exceeds N representing the number of the communication slot upon determination in step S509, the coexistence control section 403 sets the count value of the S-Slot counter 409 to "0", and counts up the D-Slot counter 410 (steps S513, S514). The coexistence control section 403 determines whether or not the D-Slot counter 410 exceeds X which represents the number of the communication slot unit 207 contained in the D-Slot basic cycle 208 (step S515). Under the circumstances where a count value of the D-Slot counter 410 does not exceed X representing the number of the communication slot unit 207, the coexistence control section 403 notifies the PLC modem 402 of "communication possible" in the case where the count value of the D-Slot counter 410 is equivalent to a predetermined value corresponding to the secured communication slot, whereas the coexistence control section 403 notifies the PLC modem 402 of "communication impossible" in the case where the count value is not equivalent to the predetermined value and then returns to determination in step S501 (steps S517 to S519). In the case where the D-Slot counter 410 exceeds X representing the number of the communication slot unit 207 upon determination in step S515, the coexistence control section 403 resets the count value of the D-Slot counter 410 to "1", and then performs processing of steps S517 to S519.

As above described, according to the communication apparatus according to the embodiment of the present invention, the coexistence control utilizing the TDM is performed by using two types of the communication slots S-Slot and D-Slot whose allocation cycles are different from each other. Accordingly, it is possible to allow a plurality of communication systems respectively having different communication modes to coexist on a single communication medium, to satisfy the QoS requirement only by using a simple configuration, and to minutely set the exclusive medium use rate.

The above-described embodiment exemplarily shows the communication slot unit 207 constituting of four communication slots S-Slots and one communication slot D-Slot, and the coexistence signal 201 constituting of seven segments H1 to H4 and Ba, Bb and Bc. The communication slots and coexistence signal can be set arbitrarily in accordance with desired communication quality, communication efficiency and the like.

Further, the coexistence signal 201 may be sent by the communication slot D-Slot of a first communication slot unit 207 in the coexistence signal cycle T 209. In this case, 2.2% of the medium, corresponding to one segment of the communication slot D-Slot is exclusively used by the coexistence signal, and thus the exclusive use rate available for data communication in the case of using a whole communication slot D-Slot corresponds to values in parentheses as shown in FIG. 3. However, the exclusive use rate is hardly affected, since the number of the communication slot units 207 set in the coexistence signal cycle T 209 for actual use is 20 or more.

Further, the plurality of communication systems to which the coexistence control of the present invention is applicable need not be constructed in a single household or have a data communication mode different from one another. The plurality of communication systems may be constituted of a communication system in one household and a communication system held in a neighboring household, both of which are interfering with each other and use a single data communication mode.

The number of the plurality of the communication systems is not limited to two, as shown in FIG. 1, but may be three or more. Further, as shown in FIG. 6, the coexistence control is applicable to a single communication system including a plurality of communication apparatuses which use a common communication medium through time-division.

Figure 6:
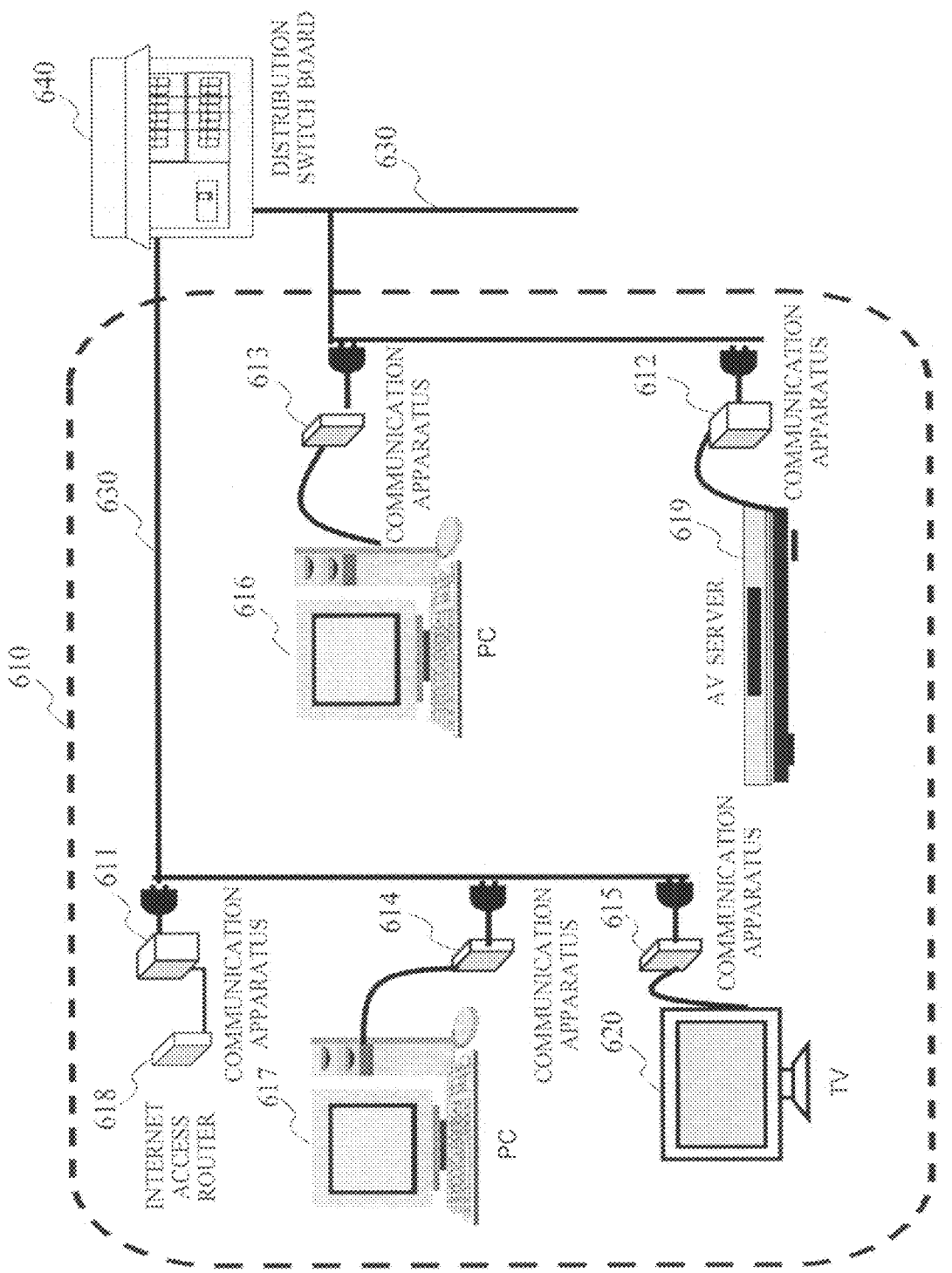
FIG. 6 is a diagram illustrating an example of another PLC constituted of the communication apparatus according to one embodiment of the present invention.
Figure 7:
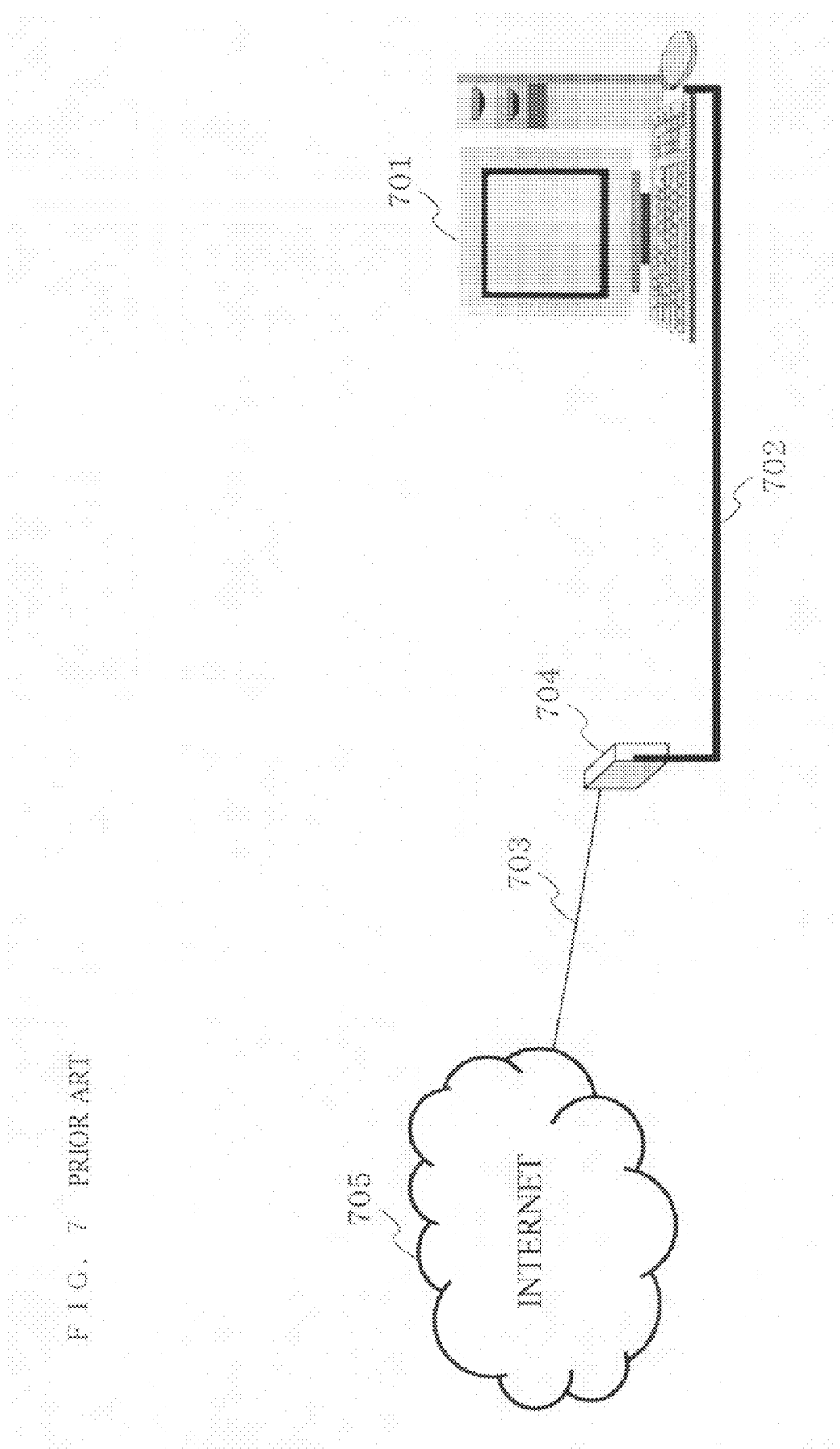
FIG. 7 is a diagram showing an example of a conventional system configuration in the case where an Internet access is performed from a home PC by using the Ethernet (registered trademark)
Figure 8:
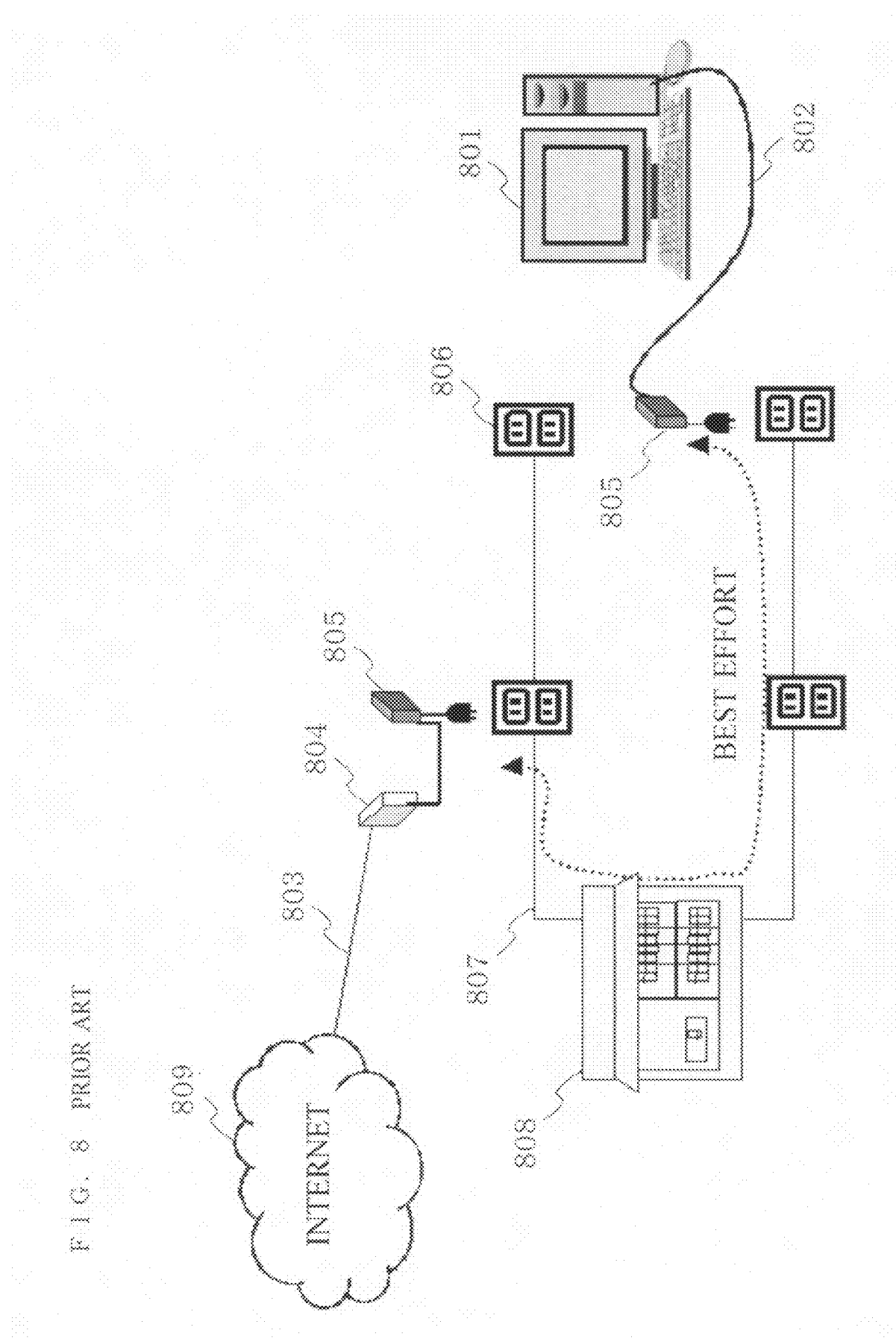
FIG. 8 is a diagram showing an example of a conventional system configuration in the case where an internet access is performed from a home PC by using a PLC.
Figure 9:
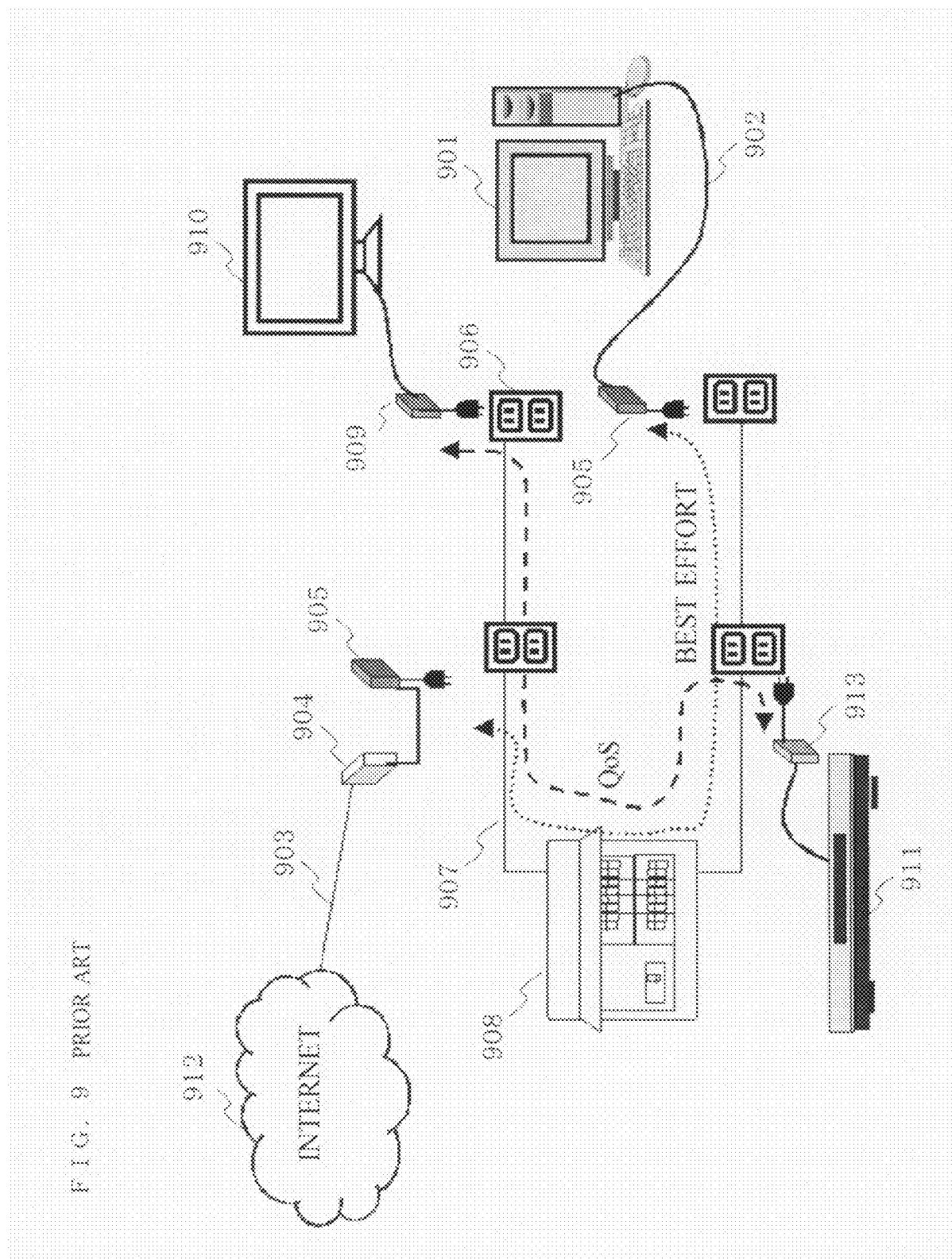
FIG. 9 is a diagram showing an example of a conventional system configuration in which a PC performing an Internet access and an AV server for viewing video on a TV coexist on a power line medium.
Figure 10:
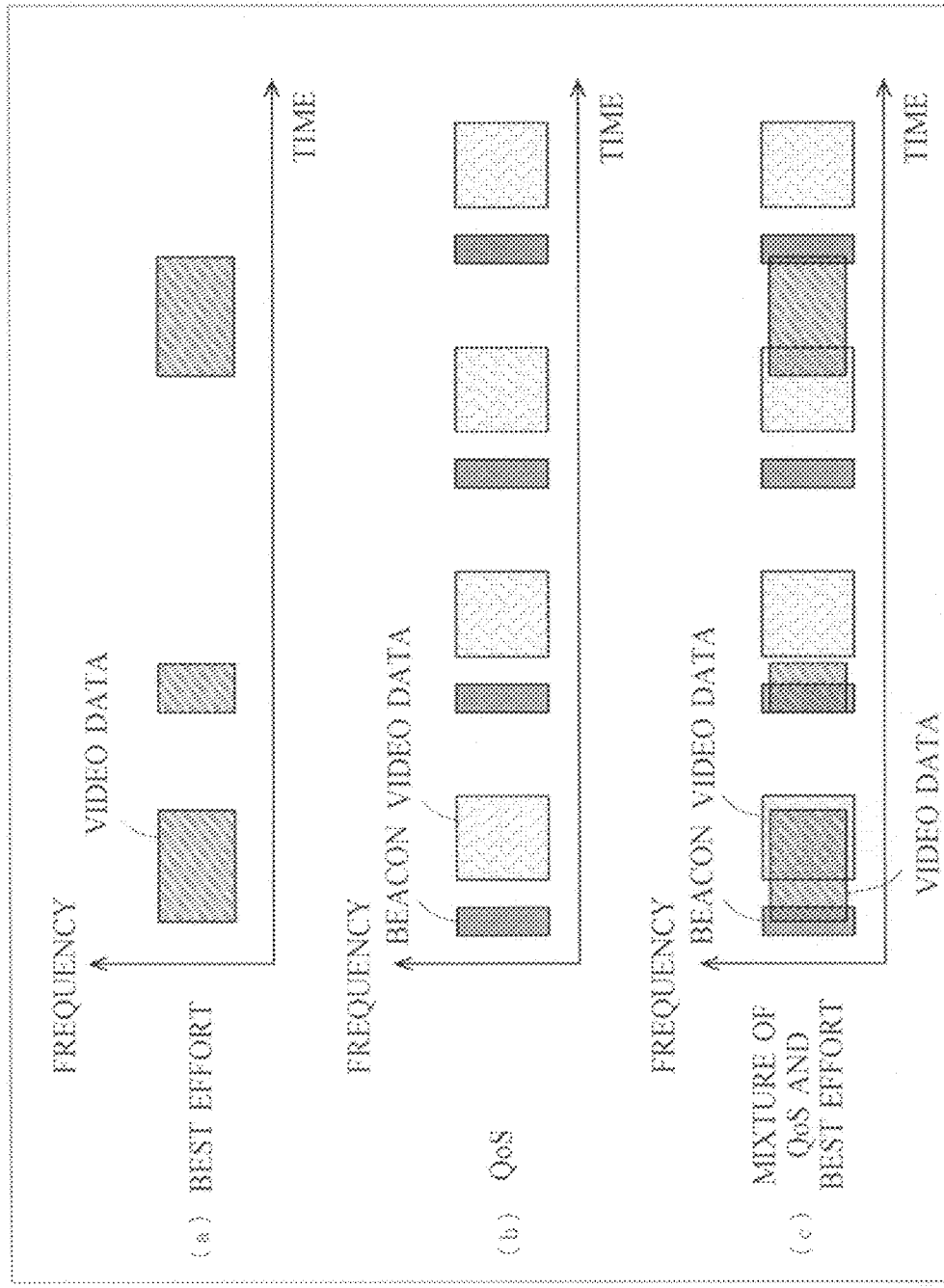
FIG. 10 is a diagram illustrating an exemplary data stream transmitted on a communication medium.
Figure 11:
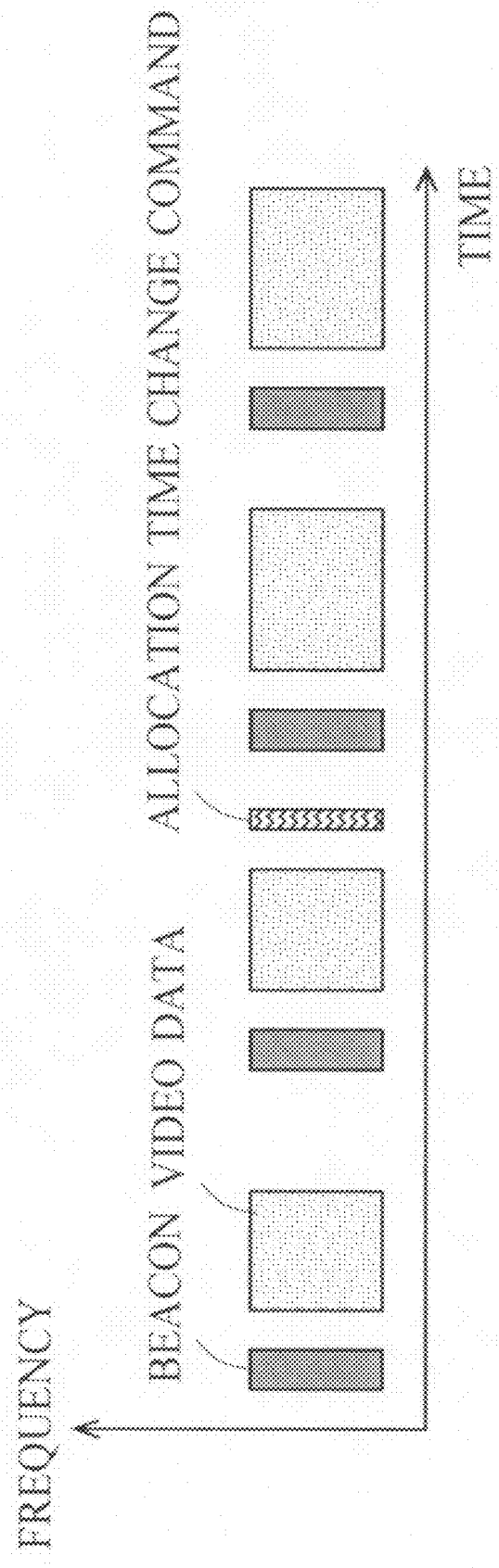
FIG. 11 is a diagram illustrating an exemplary QoS data stream transmitted on the communication medium.
Figure 12:
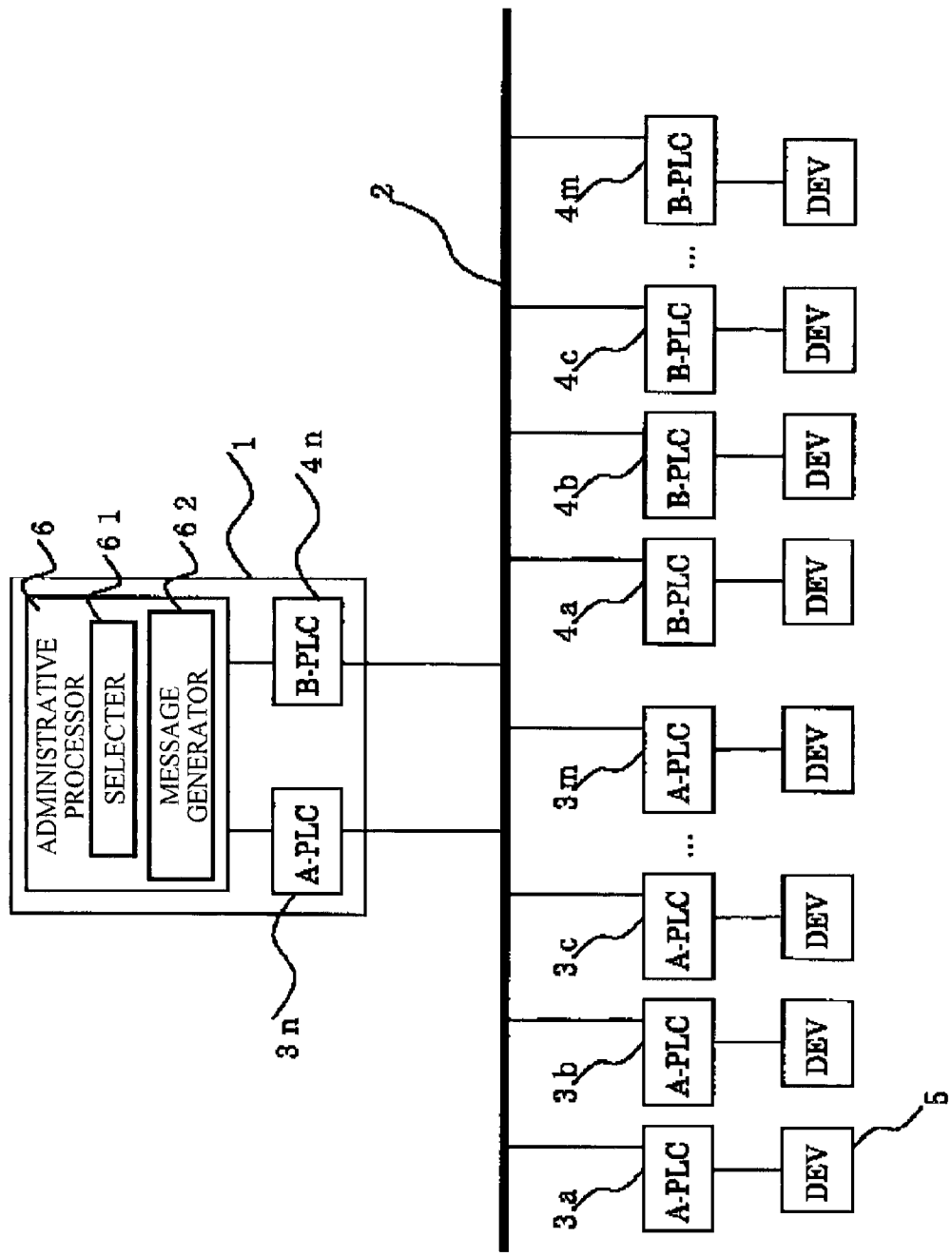
FIG. 12 is a diagram showing an example of a conventional communication system which allows coexistence of a plurality of power line modems.
Figure 13:
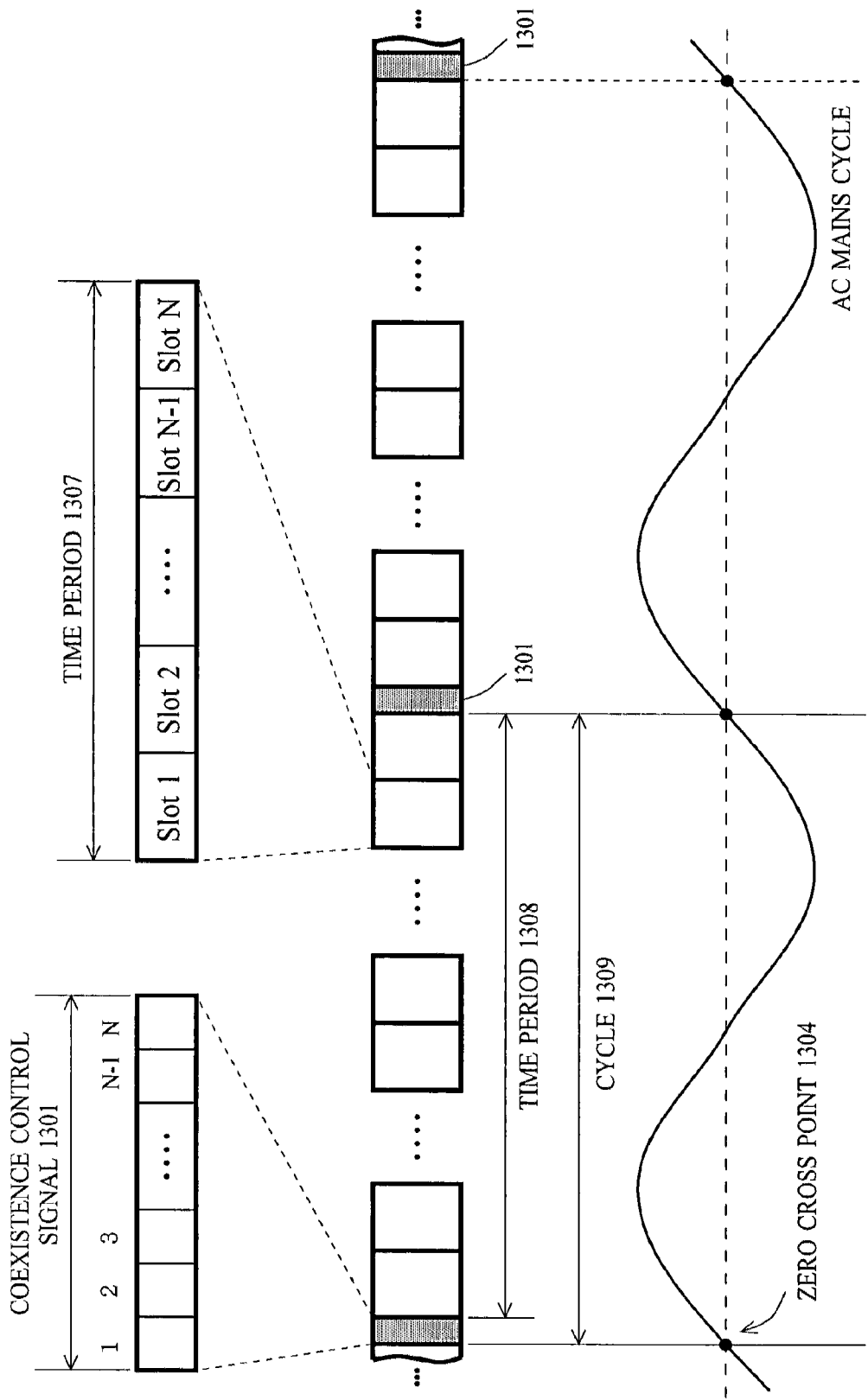
FIG. 13 is a diagram showing an exemplary coexistence control signal 1301 and a communication slot defined in a conventional communication apparatus.

In FIG. 6, one communication system 610 is defined. The communication system 610 uses a power line 630 wired in a household, and is constituted of five communication apparatuses 611 to 615.

In the communication system 610, each of the communication apparatuses 611 to 615 operates in the same manner as the master station 111 or 121 as described in the above embodiment, thereby preventing mutual communication from interrupting one another, satisfying a Qos requirement by using only a simple configuration, and minutely setting the exclusive medium use rate.

The above-described embodiment can be realized by causing a CPU to execute a program, which is able to cause a CPU to execute the above-described procedure, stored in a storage medium (such as a ROM, a RAM, a hard disc). In this case, the program may be executed after the program is stored in a storing device via the storage medium, or may be directly executed from the storage medium. Here, the storage medium includes a ROM, a RAM, a semiconductor memory such as a flash memory, a magnetic disk memory such as a flexible disk and a hard disk, an optical disk memory such as a CD-ROM, a DVD, and a BD, a memory card, and the like. The storage medium as mentioned herein is a notion including a communication medium such as a telephone line and a carrier line.

Although the embodiment of the present invention is described as above, each of the functional blocks of the master stations 111 and 121, each including the coexistence control section 403, the coexistence signal cycle timer 405, the coexistence signal transmitting section 406, the coexistence signal receiving section 407, the communication slot cycle timer 408, the S-Slot counter 409, and the D-Slot counter 410 may typically be realized as an LSI, which is an integrated circuit. Each of the functional blocks may be separately constructed in a chip form, or all or some of the functional blocks may be constructed in a chip form. Alternatively, a portion relating to communication of a system and a portion relating to transmission of the coexistence signal may be respectively constructed in separate chip forms as individual LSIs. LSI may be referred to as an IC, a system LSI, a super LSI, an ultra LSI, or the like depending on the degree of integration.

The method of integration is not limited to LSI, and may be realized by a dedicated circuit or a general purpose processor. Also, an FPGA (Field Programmable Gate Array), which is an LSI that can be programmed after manufacture, or a reconfigurable processor enabling connections and settings of the circuit cells in the LSI to be reconfigured may be used.

Further, in the case where another integration technology replacing LSI becomes available due to improvement of a semiconductor technology or due to the emergence of another technology derived therefrom, integration of the functional blocks may be performed using such a new integration technology. For example, biotechnology may be applied to the above-described integration.

The communication system including the present invention can be connected to multi-media equipment such as a personal computer, a DVD recorder, a digital television, and a home server system each having various types of interfaces, by adopting a form of an adapter which converts a signal interface such as an Ethernet (registered trademark) interface, an IEEE1394 interface, and a USB interface into a PLC interface. Accordingly, it is possible to build up a network system which transmits, at high speeds, digital data such as multimedia data by using the power line as the medium. As a result, the power line which is already installed in a household or an office can be used as it is as a network line without laying a network cable such as a conventional wired LAN, which is highly convenient in terms of costs and installation.

Further, in the future, the multi-media equipment such as the personal computer, the DVD recorder, the digital television, and the home server system will incorporate a function including the present invention, thereby data transmission among equipment can be realized via a power cord of the multi-media equipment. In this case, the adapter, an Ethernet (registered trademark) cable, an IEEE1394 cable, a USB cable and the like will not be required, and wiring will be simplified. Further, since a connection to the Internet via a router or a connection to a wireless LAN or a conventional wired cable LAN by using a hub or the like is available, an expansion of a LAN system using a high-speed power line transmission system of the present invention can be enhanced without any problem.

In the power line transmission mode, since the communication data flows via the power line, a problem of data leakage caused by eavesdropping of electric waves will not occur, unlike the wireless LAN. Therefore, the power line transmission mode has an effect of data protection in terms of security. Data flowing through the power line is naturally protected through IPsec in an IP protocol, encoding of a content, other DRM modes and the like.

As above described, it is possible to transmit a high quality AV content through the power line by accommodating a copyright protection function such as encoding of a contents and a Qos function which includes the effects of the present invention (improvement in throughput, band allocation flexibly responding to increase in retransmission and traffic change).

While the invention has been described in detail, the foregoing description is in all aspects illustrative and not restrictive. It is understood that numerous other modifications and variations can be devised without departing from the scope of the invention.

What is claimed is:

1. A communication apparatus used for one communication system among a plurality of communication systems respectively coexisting with one another on a single power line communication medium, the communication apparatus comprising:

a controller to divide a communication band so as to allow a first time period in which a coexistence signal for designating a communication slot exclusively used on the power line communication medium by the communication system belonging to the communication apparatus is transmitted, and a second time period in which a first communication slot and a second communication slot are allocated, to be alternately repeated at a predetermined coexistence signal cycle; and a transmitter to transmit the coexistence signal at the coexistence signal cycle, wherein the controller allocates, during the second time period at a first cycle, the first communication slot and the second communication slot;

sets, for the first communication slot during the second time period, a communication right for a single communication system, repeatedly at the first cycle;

sets, for the second communication slot during the second time period, a communication right for the single communication system, repeatedly at a second cycle which is longer than the first cycle; and allocates the communication slot exclusively used, as a combination of the first communication slot and the second communication slot, by the communication system belonging to the communication apparatus, wherein the second cycle is a subset of the coexistence signal cycle, and wherein the first cycle is a subset of the second cycle.

2. The communication apparatus according to claim 1, wherein the controller allocates, during the second time period at the first cycle, M communication slot units each including the first communication slot and the second communication slot;

the second cycle is a cycle obtained by multiplying the first cycle with M/X; and M is an integer of 2 or more and X is a submultiple of M.

3. The communication apparatus according to claim 1, wherein the controller sets a communication right for a single communication system by using a combination of the second communication slots allocated to each time period in the second cycle.

4. The communication apparatus according to claim 1, wherein the coexistence signal includes X segments each corresponding to a unit of M/X in each of the first communication slots and one segment corresponding to a unit of M in each of the second communication slots, an exclusive use of the communication slot which is allocated by the controller is declared by storing predetermined information on a segment, among a plurality of segments representing the X segments and the N segments of the coexistence signal, corresponding to the communication slot to be used exclusively, and M is an integer of 2 or more and X is a submultiple of M.

5. The communication apparatus according to claim 1, wherein the first communication slot is set as 1 piece, and the second communication slots are set as N-1 pieces; and N is an integer of 2 or more.

6. The communication apparatus according to claim 1, wherein the communication medium is a power line, and a starting point of the first cycle is set at a zero cross point of an AC current flowing on the power line.

7. A communication apparatus coexisting with other communication apparatuses on a single power line communication medium, the communication apparatus comprising:

a controller to divide a communication band so as to allow a first time period in which a coexistence signal for designating a communication slot exclusively used on the power line communication medium by the communication system belonging to the communication apparatus is transmitted, and a second time period in which a first communication slot and a second communication slot are allocated, to be alternately repeated at a predetermined coexistence signal cycle; and a transmitter to transmit the coexistence signal at a predetermined cycle including the first time period and the second time period, wherein the controller allocates, during the second time period at a first cycle, the first communication slot and the second communication slot;

sets, for the first communication slot during the second time period, a communication right for a single communication system, repeatedly at the first cycle;

sets, for the second communication slot during the second time period, a communication right for the single communication system, repeatedly at a second cycle which is longer than the first cycle; and allocates the communication slot exclusively used, as a combination of the first communication slot and the second communication slot, by the communication system belonging to the communication apparatus, wherein the second cycle is a subset of the coexistence signal cycle, and wherein the first cycle is a subset of the second cycle.

8. The communication apparatus according to claim 7, wherein the controller allocates, during the second time period at the first cycle, M communication slot units each including the first communication slot and the second communication slot;

the second cycle is a cycle obtained by multiplying the first cycle with M/X; and M is an integer of 2 or more and X is a submultiple of M.

9. The communication apparatus according to claim 7, wherein the controller sets a communication right for a single communication system by using a combination of the second communication slots allocated to each time period in the second cycle.

10. The communication apparatus according to claim 7, wherein the coexistence signal includes X segments each corresponding to a unit of M/X in each of the first communication slots and one segment corresponding to a unit of M in each of the second communication slots, an exclusive use of the communication slot which is allocated by the controller is declared by storing predetermined information on a segment, among a plurality of segments representing the X segments and the N segments of the coexistence signal, corresponding to the communication slot to be used exclusively, and M is an integer of 2 or more and X is a submultiple of M.

11. The communication apparatus according to claim 7, wherein the first communication slot is set as 1 piece, and the second communication slots are set as N-1 pieces; and N is an integer of 2 or more.

12. The communication apparatus according to claim 7, wherein the communication medium is a power line, and a starting point of the first cycle is set at a zero cross point of an AC current flowing on the power line.

13. A non-transitory computer readable medium encoded with computer executable instructions that, when executed by a computer included in a communication apparatus used for one communication system among a plurality of communication systems respectively coexisting with one another on a single power line communication medium, cause the computer to perform a method comprising steps of:

dividing, by a controller, a communication band so as to allow a first time period in which a coexistence signal for designating a communication slot exclusively used on the power line communication medium by the communication system belonging to the communication apparatus is transmitted, and a second time period in which a first communication slot and a second communication slot are allocated, to be alternately repeated at a predetermined coexistence signal cycle;

allocating, by the controller during the second time period at a first cycle, the first communication slot and the second communication slot;

setting, by the controller, for the first communication slot during the second time period, a communication right for a single communication system, repeatedly at the first cycle;

setting, by the controller, for the second communication slot during the second time period, a communication right for the single communication system, repeatedly at a second cycle which is longer than the first cycle;

allocating, by the controller, the communication slot exclusively used, as a combination of the first communication slot and the second communication slot, by the communication system belonging to the communication apparatus; and transmitting, by a transmitter, the coexistence signal at the coexistence signal cycle, wherein the second cycle is a subset of the coexistence signal cycle, and wherein the first cycle is a subset of the second cycle.

14. An integrated circuit which is used in a communication apparatus used for one communication system among a plurality of communication systems respectively coexisting with one another on a single power line communication medium, the integrated circuit comprising circuits functioning as:

a controller to divide a communication band so as to allow a first time period in which a coexistence signal for designating a communication slot exclusively used on the power line communication medium by the communication system belonging to the communication apparatus is transmitted, and a second time period in which a first communication slot and a second communication slot are allocated, to be alternately repeated at a predetermined coexistence signal cycle; and a transmitter to transmit the coexistence signal at the coexistence signal cycle, wherein the controller allocates, during the second time period at a first cycle, the first communication slot and the second communication slot;

sets, for the first communication slot during the second time period, a communication right for a single communication system, repeatedly at the first cycle;

sets, for the second communication slot during the second time period, a communication right for the single communication system, repeatedly at a second cycle which is longer than the first cycle; and allocates the communication slot exclusively used, as a combination of the first communication slot and the second communication slot, by the communication system belonging to the communication apparatus, wherein the second cycle is a subset of the coexistence signal cycle, and wherein the first cycle is a subset of the second cycle.

* * * * *